(12) United States Patent
Conner et al.

(10) Patent No.: US 7,921,729 B2
(45) Date of Patent: Apr. 12, 2011

(54) DISCONNECT SENSOR

(75) Inventors: Patrick D. Conner, Rockford, IL (US); Andrew N. Baines, Rockton, IL (US); William E. Leden, Roscoe, IL (US); Dale W. Massolle, Davis Junction, IL (US); Teddy L. Jones, Cherry Valley, IL (US); Jeffrey T. Wavering, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 322 days.

(21) Appl. No.: 12/045,077

(22) Filed: Mar. 10, 2008

(65) Prior Publication Data
US 2009/0223791 A1 Sep. 10, 2009

(51) Int. Cl.
*G01L 1/00* (2006.01)

(52) U.S. Cl. .......... 73/783; 73/855; 340/686.1; 340/687

(58) Field of Classification Search .................... 73/783, 73/855
See application file for complete search history.

(56) References Cited

U.S. PATENT DOCUMENTS

| | | | |
|---|---|---|---|
| 5,144,851 A | 9/1992 | Grimm | |
| 5,680,124 A | 10/1997 | Bedell | |
| 5,686,907 A | 11/1997 | Bedell | |
| 5,743,490 A | 4/1998 | Gillingham | |
| 5,950,774 A | 9/1999 | Lang | |
| 6,299,108 B1 | 10/2001 | Lindstrom | |
| 6,376,786 B1* | 4/2002 | Ishibashi | 200/61.62 |
| 6,466,141 B1* | 10/2002 | McKay et al. | 340/963 |
| 6,483,436 B1 | 11/2002 | Emaci | |
| 6,860,452 B2 | 3/2005 | Bacon | |
| 7,059,182 B1* | 6/2006 | Ragner | 73/200 |
| 7,354,022 B2* | 4/2008 | Richter et al. | 244/194 |
| 7,375,645 B2* | 5/2008 | Tsai | 340/665 |
| 2002/0171556 A1* | 11/2002 | Emaci et al. | 340/686.2 |
| 2006/0229055 A1* | 10/2006 | Tsai | 455/403 |
| 2007/0080261 A1 | 4/2007 | Neumann | |
| 2007/0145180 A1 | 6/2007 | Johnson | |

* cited by examiner

*Primary Examiner* — Freddie Kirkland, III
(74) *Attorney, Agent, or Firm* — Carlson, Gaskey & Olds

(57) ABSTRACT

A sensor assembly for sensing relative movement between adjacent panels includes a base and first and second arms pivotally mounted to the base. An electrical connecting element is attached to the first and second arms and holds the first and second arms in a first position to indicate a first condition. When the first and second arms have moved relative to each other by a predetermined amount, the electrical connecting element breaks to indicate a second condition.

19 Claims, 11 Drawing Sheets

DISCONNECT SENSOR

BACKGROUND OF THE INVENTION

This disclosure relates to a sensor that detects skewed or disconnected adjacent movable components, and more particularly to a sensor that detects skewed or disconnected aircraft control surfaces such as slats or flaps, for example.

Aircraft wings employ high-lift devices that are often referred to as auxiliary airfoils or control surfaces. During takeoff and landing of the aircraft, a pilot can extend these control surfaces from a leading or a trailing edge of a wing to increase aerodynamic lift. When extended, the surfaces increase the effective size, curvature, camber, and area of the wing. This extension increases the lift of the wing for slow-speed flight. Control surfaces that extend from the leading edge of the wing are referred to as slats, while control surfaces that extend from the trailing edge of the wing are referred to as flaps. Slats are used primarily to increase lift at large angles of attack, while flaps are designed primarily to increase lift during landing.

An actuation system is used to extend or retract the control surfaces. Single or multiple actuators can be used to drive a single control surface. Also, a plurality of actuators can be coordinated for a control surface. A control surface actuator is typically a geared device located in the wing that is driven by a power source, such as an electric motor for example.

When two independent actuators drive a single control surface, only limited asymmetrical movement of the leading or trailing edge, respectively, of a slat or flap that is not parallel to the leading or trailing edge of the wing, respectively, can be tolerated. Such misaligned movement is called "skew." If one of the actuators fails, skew of the surface that the actuator drives may occur. This skew may jam a control surface mechanism, thereby restricting control of the aircraft. A surface may jam if the forces on the surface are asymmetrical. If both actuators driving the same surface fail, the surface may separate from the wing and be lost.

A single actuator can be used to actuate a control surface; however, this method does not supply the desirable redundancy that multiple actuators afford. Multiple actuators provide a margin of safety. Use of multiple actuators, however, requires synchronization, which requires additional complexity. In addition, the control surface must be structurally capable of withstanding the force of a failed single actuator while the remaining actuator or actuators apply force. Thus, it is important to be able to detect relative movement between adjacent movable control surfaces, i.e. slats or flaps.

In one known configuration, a sensor includes a reed switch and magnet that are used to sense movement between adjacent movable control surfaces. A reed switch on one arm of the sensor is held close to a magnet on another arm of the sensor by an aluminum fuse, i.e. a mechanical fuse, which forms a closed switch. When the fuse breaks due to a certain amount of movement between adjacent movable panels, a leaf spring causes the reed switch and the magnet to separate to open the switch.

One disadvantage with this traditional sensor is that it can be unreliable under certain conditions. Further, it is difficult to assemble and requires different parts to be incorporated into right hand and left hand wing positions. The reed switch may fail in the closed position, a failure mode which is not detected by the control unit. This fault may go undetected on the aircraft until maintenance personnel perform a manual check of each sensor, which typically occurs during an aircraft level periodic maintenance interval.

Accordingly, there is a need for a more reliable, cost-effective, sensor that has few parts and is easier to assemble. Further, the new design must fit the same envelope as the current design

SUMMARY OF THE INVENTION

A sensor assembly for sensing relative movement between adjacent panels includes a base and first and second arms pivotally mounted to the base. An electrical connecting element is attached to the first and second arms and holds the first and second arms in a first position to indicate a first condition. When the first and second arms have moved relative to each other by a predetermined amount, the electrical connecting element breaks to indicate a second condition. In one example, the electrical connecting element comprises a circuit board.

In one example, the adjacent panels comprise control surfaces on an aircraft wing such as flaps or slats. The base is mounted to one control surface and the first and second arms extend to overlap an adjacent control surface. The adjacent control surface includes a striker pin that is positioned between the first and second arms. The gap between the arms is sized to allow for normal system movement without detecting a failure. When relative movement between adjacent control surfaces occurs, the striker pin contacts one of the first and second arms. When a predetermined movement limit has been exceeded, a striker pin force against the one of the first and second arms causes the circuit board to break to indicate the second condition, i.e. to indicate that an acceptable amount of relative movement between adjacent control surfaces has been exceeded.

In one example, the electrical connecting element comprises a printed circuit board with an aluminum core.

In one example, the circuit board includes a connection interface to receive a direct current voltage signal. When the arms are in the first position, a closed circuit is provided. When the circuit board breaks, an open circuit occurs to indicate the second condition.

In one example, the circuit board includes a first end that is fastened to the first arm with a first fastener and a second end that is fastened to the second arm with a second fastener. A removed section is formed within the circuit board between the first and second ends. A trace of the circuit board goes from the first end across the removed section, going from the first end to the second end a minimum of one (1) time before terminating. In one example, the trace forms a loop in the second end and comes back to the first end before terminating at a solder joint. In one example, the removed section comprises a pair of opposing slots that form a narrow neck portion. The circuit board breaks at the narrow neck portion to indicate the second condition.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
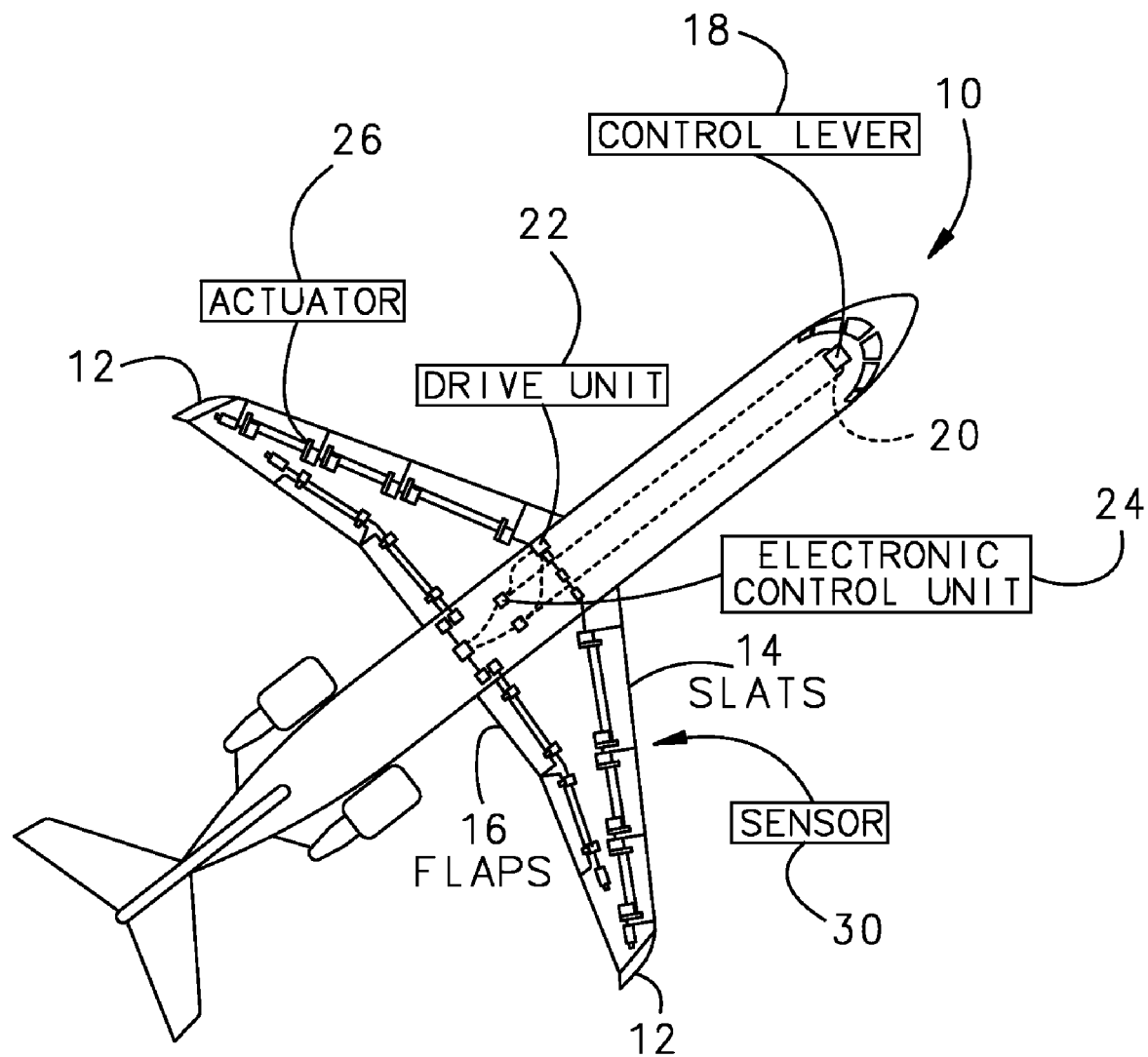
FIG. 1 is a highly schematic top view of a typical aircraft showing wing control surfaces and associated actuators and controls.

FIG. 1 illustrates a typical aircraft 10 that has two wings 12, each having a plurality of control surfaces, such as slats 14 and flaps 16. These control surfaces are movable surfaces to control lift. In one example, a control lever 18 for the slats 14 and flaps 16 is located in a cockpit 20. A drive unit 22 controlled by an electronic control unit 24 transmits torque to a plurality of actuators 26, which may be used to drive slats 14 or flaps 16. A sensor 30 is attached between adjacent control surfaces to sense relative movement between adjacent control surfaces.

Figure 2:
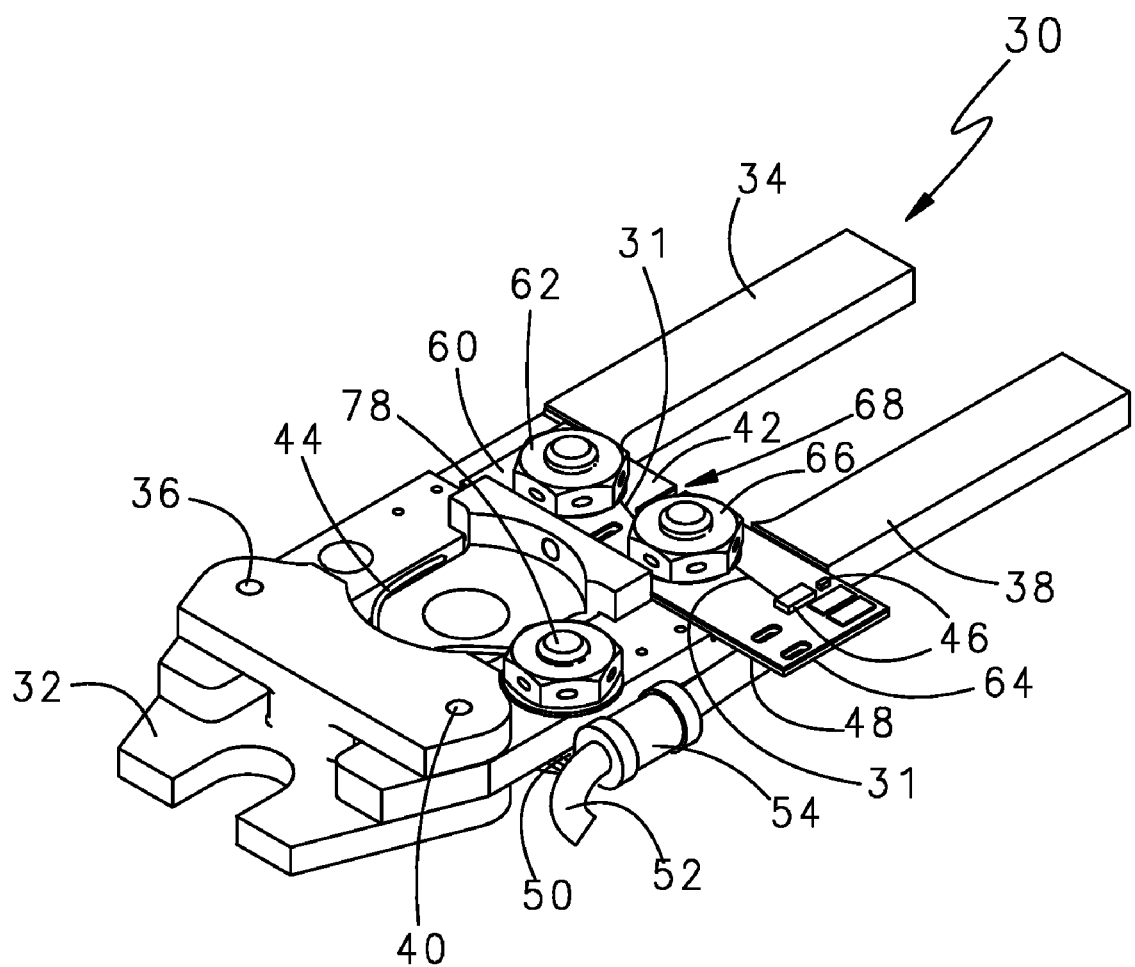
FIG. 2 is an isometric view of a sensor for a wing control surface.

FIG. 2 illustrates an example of the sensor 30. The sensor 30 includes a base 32, a first arm 34 pivotally connected to the base 32 with a first pin 36, a second arm 38 pivotally connected to the base 32 with a second pin 40, and an electrical connecting element that is attached to the first 34 and second 38 arms. In the example shown, the electrical connecting element comprises a circuit board 42; however other types of electrical connecting elements could also be used. The circuit board 42 holds the first 34 and second 38 arms together in a first or closed position. A spring element 44 supported by the base 32 is used to assist in pushing the first 34 and second 38 arms apart to move into a second or open position when the circuit board 42 breaks.

In this example, the circuit board 42 is used as a connector to hold the first 34 and second 38 arms together for either no movement between adjacent control surfaces, or for an acceptable amount of movement between adjacent control surfaces. When relative movement between adjacent control surfaces has exceed an acceptable limit, the connection between the first 34 and second 38 arms is severed, i.e. the circuit board 42 breaks once a predetermined force against one of the first 34 and second 38 arms has been achieved. In the example shown, the circuit board 42 breaks under a load in tension. This will be discussed in greater detail below.

The circuit board includes associated electronics 46 and a connection interface 48 that receives a direct current (DC) signal from a power source. Alternatively, the sensor 30 could be configured for alternating current (AC). A support 50 is mounted to one of the first 34 and second 38 arms to assist in connection of a wire 52 to the connection interface 48. The support 50 includes a guide portion 54 that receives the wire 52 to properly route the wire 52 in a direction toward the circuit board 42.

In the example shown, the connection interface 48 allows the circuit board 42 to carry a 28 VDC signal. When the first 34 and second 38 arms are in the first position, i.e. when the first 34 and second 38 arms are connected to each other via the circuit board 42, a closed circuit is provided. When the first 34 and second 38 arms move to the second position, i.e. the circuit board 42 breaks, an open circuit is provided, which indicates to the electronic control unit 24 that an acceptable limit of relative movement between adjacent control surfaces has been exceeded.

In the example shown, the circuit board 42 comprises a printed circuit board (PCB) that includes an aluminum core. Other circuit board configurations could also be used. The circuit board 42 has a first end 60 that is attached to the first arm 34 with a first fastener 62 and a second end 64 that is attached to the second arm 38 with a second fastener 66. A removed section, shown generally at 68, is formed in the circuit board 42 at a position between the first 60 and second 64 ends. The removed section 68 provides a "weakened" section of the circuit board 42 that breaks when a predetermined force against one of the first 34 and second 38 arms is met or exceeded. This will be discussed in greater detail below.

A trace 31 (FIG. 2) of the circuit board 42 goes from the first end 60 across the weakened section 68, going from the first end 60 to the second end 64 a minimum of one (1) time before terminating. In one example, the trace forms a loop in the second end 64 and comes back to the first end 60 before terminating at a solder joint.

Figure 3:
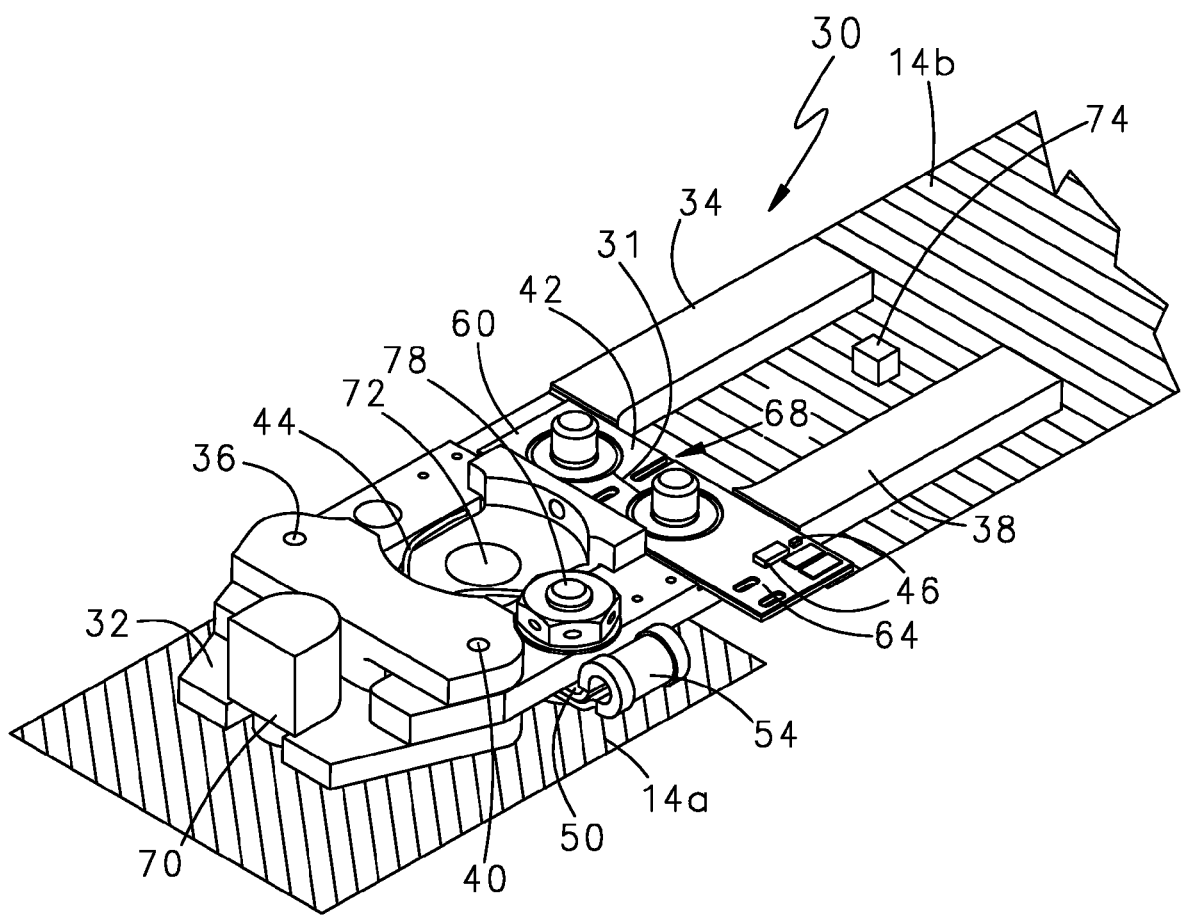
FIG. 3 is an isometric view of the sensor of FIG. 3 installed between adjacent control surfaces.

FIG. 3 shows cutaway portions of two adjacent movable components. For example, these components may be adjacent aircraft control surfaces, more particularly, two adjacent slats 14 on a wing 12; however, other control surfaces could also be utilized. The sensor 30 in this slat example may detect whether acceptable limits for slat skew are exceeded. Relatively small aircraft may only have one slat per wing, but larger aircraft have multiple slats, each typically actuated by at least two hydraulic or electrically powered actuators 26.

Fasteners 70, 72 rigidly attach the sensor 30 to one slat 14a. A striker pin 74 is rigidly attached to an adjacent slat 14b. Under normal conditions, the striker pin 74 carries no load and the sensor 30 comprises a closed circuit with the circuit board 42 interconnecting the first 34 and second 38 arms, and, as such, the circuit board 42 keeps the first 34 and second 38 arms in the closed position. In one example, an adjustment mechanism could be used to center the striker pin 74 between the first 34 and second 38 arms. In one example, the adjustment mechanism comprises an eccentric bushing that would be used with the fastener 72.

If an actuator 26 disconnects, for example, from a slat 14, one slat end may remain stationary with respect to the wing while the other end of the slat moves, possibly resulting in sufficient asymmetrical movement (i.e., a harmful skew) between adjacent slats 14a, 14b. As the skew increases, the clearance between one of the first 34 and second 38 sensor arms and the striker pin 74 decreases. The sensor 30 ignores a minimal range of skewed motion of the striker pin 74 so long as the striker pin 74 stays within a space defined between the first 34 and second 38 arms when in the first position. With greater motion of striker pin 74, caused by a more significant amount of skew, the striker pin 74 abuts one of the first 34 and second 38 arms. Which of the first 34 and second 38 arms the striker pin 74 abuts, depends upon the direction of asymmetrical movement or skew of the slat 14. Then, with further skew between the two adjacent slats 14a, 14b, the striker pin 74 pushes the first 34 and second 38 arms apart. The circuit board 42 then breaks within a predetermined tension range and an open circuit is provided.

In one application, the slat panel ends are interconnected by sealing pins. If an actuator 26 disconnects from a slat 14, the affected end of the slat panel moves with the adjacent end, possibly resulting in increased load being applied to the nearest remaining actuator on adjacent slats 14a, 14b. As the load on the actuator increases, the clearance between one of the first 34 and second 38 sensor arms and the striker pin 74 decreases. The sensor 30 ignores a minimal range of skewed motion of the striker pin 74 so long as the striker pin 74 stays within a space defined between the first 34 and second 38 arms when in the first position. With greater motion of the striker pin 74, caused by a more significant amount of load, the striker pin 74 abuts one of the first 34 and second 38 arms. Which of the first 34 and second 38 arms the striker pin 74 abuts, depends upon the direction of asymmetrical movement or skew of the slat 14. Then, with further skew between the two adjacent slats 14a, 14b, the striker pin 74 pushes the first 34 and second 38 arms apart. The circuit board 42 then breaks within a predetermined tension range and an open circuit is provided.

Once the circuit board 42 breaks, the spring element 44 then exerts a force that pushes the first 34 and second 38 arms apart. When the sensor 30 assumes an open circuit, a warning can be communicated to the cockpit 20 and the electronic control unit 24 for the control surface may annunciate a fault for later inspection while permitting continued slat operation. In other applications, the electronic control unit 24 may disable slat operation.

Figure 4:
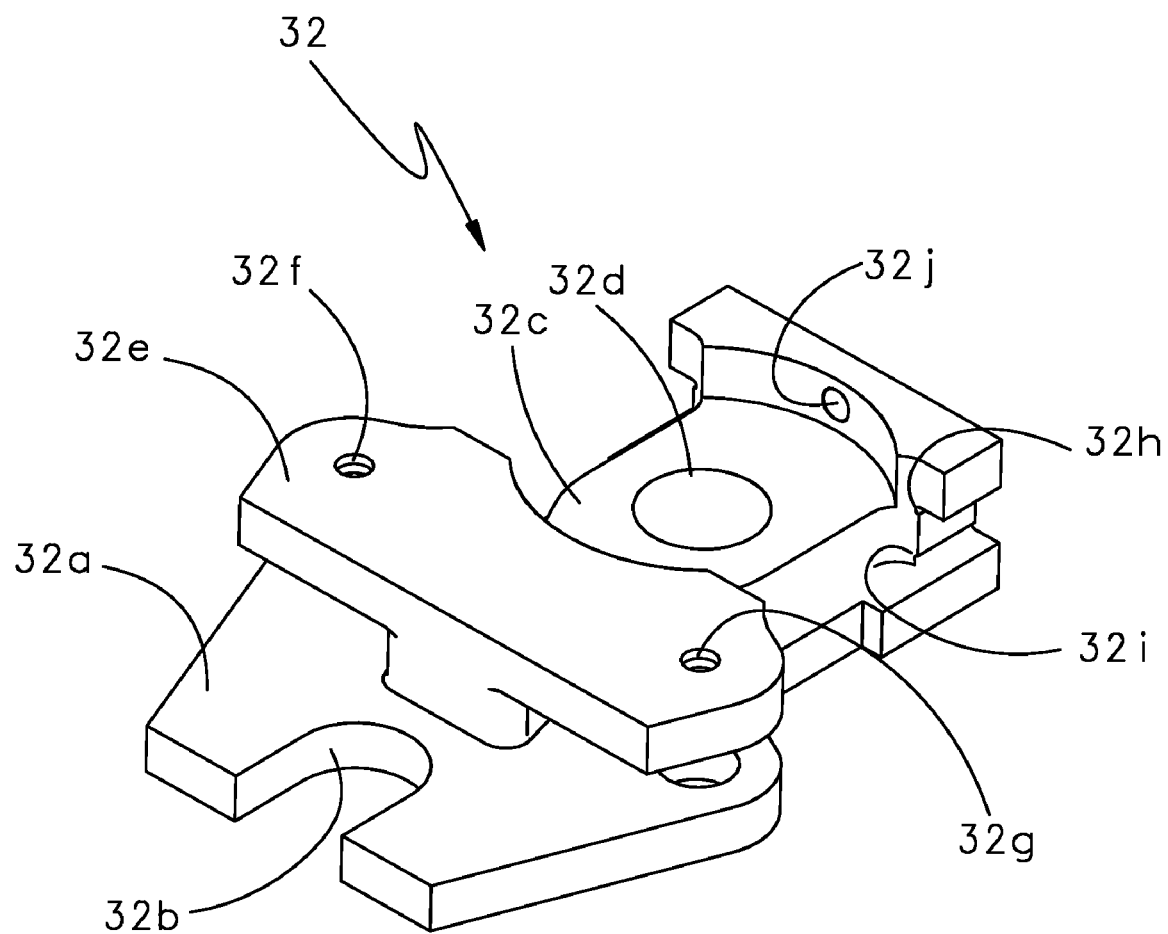
FIG. 4 is an isometric view of a base of the sensor.

The base 32 is shown in greater detail in FIG. 4. The base 32 includes a bottom portion 32a with a first opening 32b to receive the fastener 70 (FIG. 3). An intermediate portion 32c includes a second opening 32d that receives the fastener 72 (FIG. 3). An upper portion 32e includes first 32f and second 32g holes to respectively receive the first 36 and second 40 pins that pivotally secure the first 34 and second 38 arms to the base 32. Cutouts 32h, 32i form respective surfaces that contact the first and second arms 34, 38. The arms 34, 38 must touch these surfaces to control a gap between the first 34 and second 38 arms. Also shown is a hole 32j for a safety cable.

Figure 5:
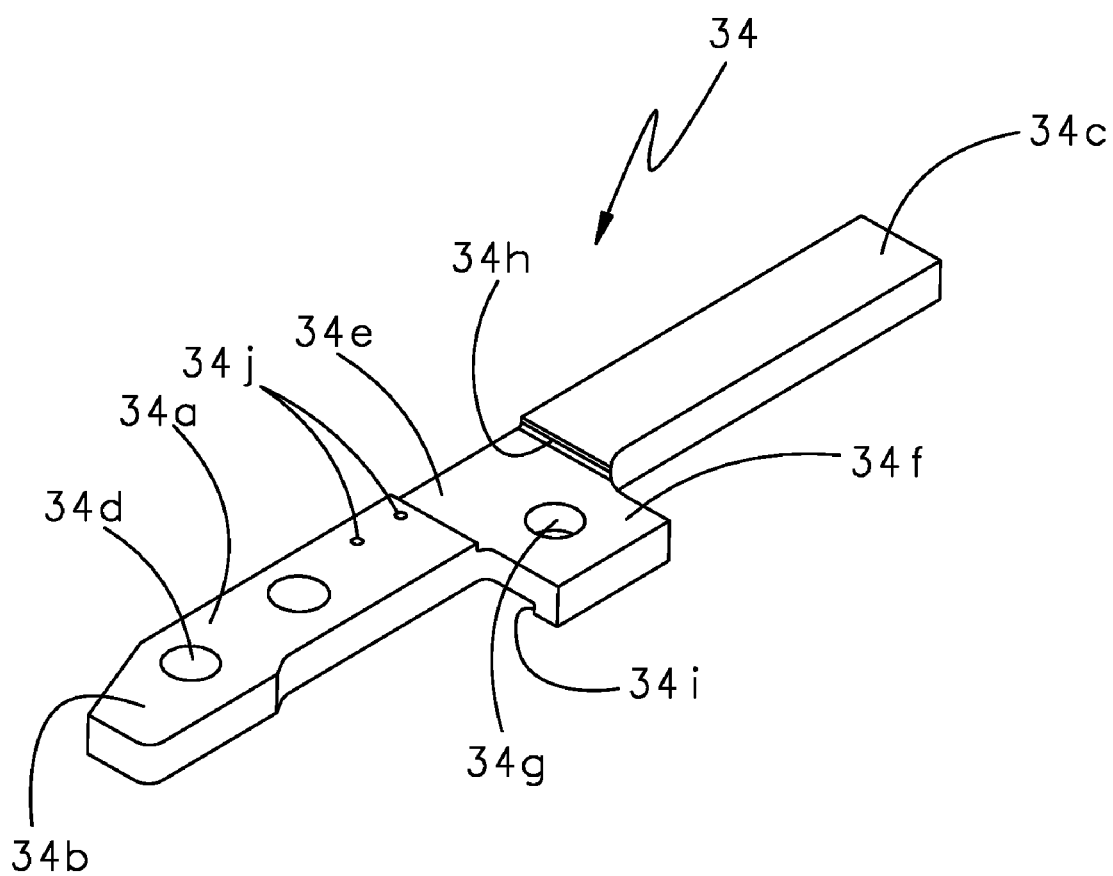
FIG. 5 is an isometric view of one sensor arm.
Figure 6:
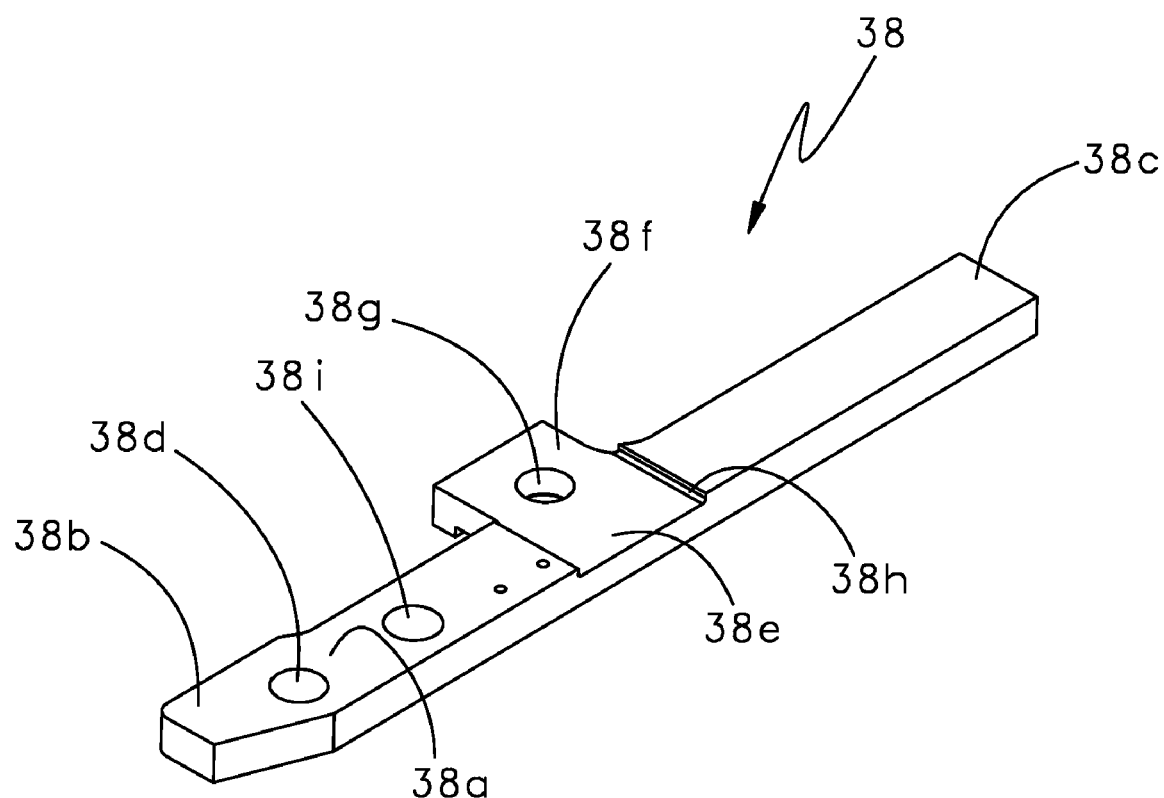
FIG. 6 is an isometric view of the other sensor arm.

The first 34 and second 38 arms are shown in greater detail in FIGS. 5-6. The first arm 34 (FIG. 5) comprises an elongate body 34a with a first end 34b and a second end 34c. An opening 34d is located at the first end 34b to receive the first pin 36 (FIG. 2). A central portion 34e includes an inwardly extending tab 34f with an opening 34g that receives the fastener 62 (FIG. 2), which secures the circuit board 42 to the first arm 34. The central portion 34e includes a recessed area 34h to facilitate installation of the circuit board 42. The inwardly extending tab 34f includes an anti-rotation feature 34i that cooperates with a D-bolt head. Also shown are safety cable holes 34j for anti-rotation of reduced height fasteners.

The second arm 38 (FIG. 6) comprises an elongate body 38a with a first end 38b and a second end 38c. An opening 38d is located at the first end 38b to receive the second pin 40 (FIG. 2). A central portion 38e includes an inwardly extending tab 38f with an opening 38g that receives the fastener 66 (FIG. 2), which secures the circuit board 42 to the second arm 38. The central portion 38e includes a recessed area 38h to facilitate installation of the circuit board 42. Another opening 38i is formed in the elongate body 38a between the first end 38b and the central portion 38e to receive a fastener 78 (FIG. 2), which secures the support 50 for the wire 52 to the second arm 38.

Figure 7:
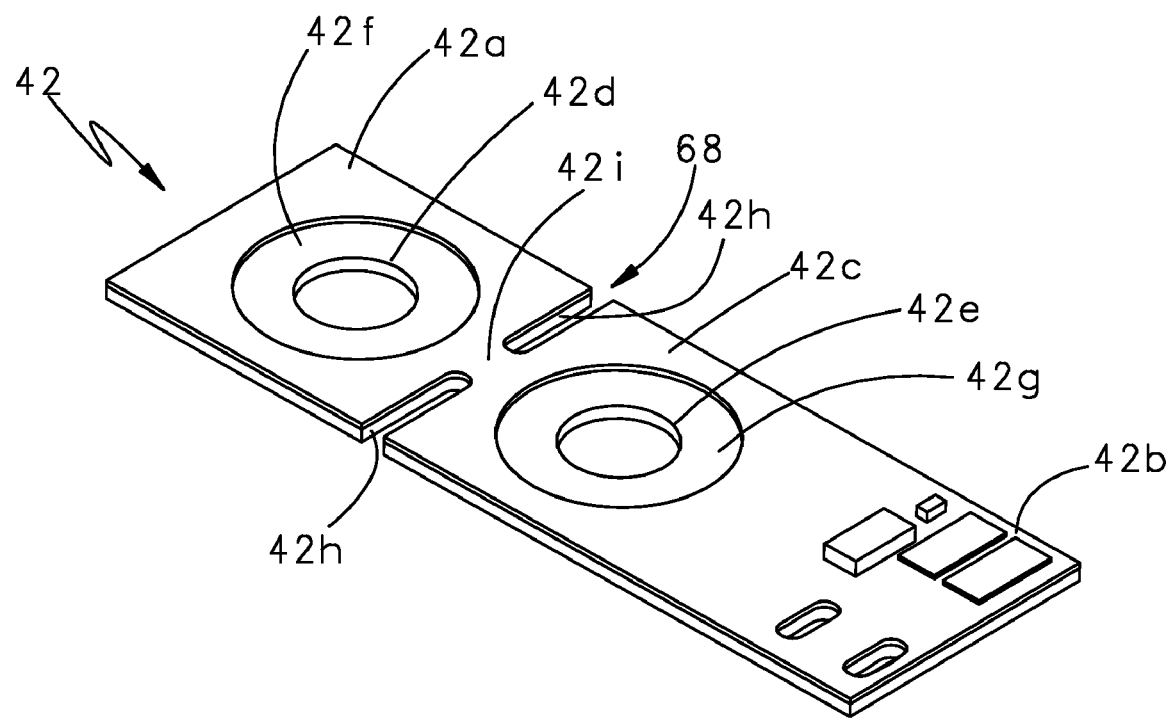
FIG. 7 is an isometric view of a circuit board of the sensor.

The circuit board 42 is shown in greater detail in FIG. 7. The circuit board 42 includes a first end 42a, a second end 42b, and a central portion 42c located between the first 42a and second 42b ends. A first opening 42d is formed near the first end 42a to receive the first fastener 62 (FIG. 2) to secure the circuit board 42 to the first arm 34, and second opening 42e is formed between the second end 42b and the central portion 42c to receive the second fastener 66 (FIG. 2) that secures the circuit board 42 to the second arm 38. A first clearance area 42f is formed within an upper surface of the circuit board 42 to provide clearance for a washer of the first fastener 62, and a second clearance area 42g is similarly formed for the second fastener 66.

In the example shown in FIG. 7, the removed section 68 comprises a pair of opposing slots 42h that extend toward each other from opposing edges of the central portion 42c. The slots 42h are axially separated from each other by a narrow neck portion 42i. This narrow neck portion 42i forms the "weakened" portion of the circuit board 42 that breaks in response to a predetermined tension load. Using a narrowing neck portion is just one example of providing a "weakened" section for the circuit board 42. The circuit board 42 could also provide a weakened section at a desired area by scoring the circuit board, perforating the circuit board, using a different material to provide a weakened section, or by using a wire having a specified tensile strength, for example. Other methods of weakening the circuit board 42 could also be used.

Figure 8A:
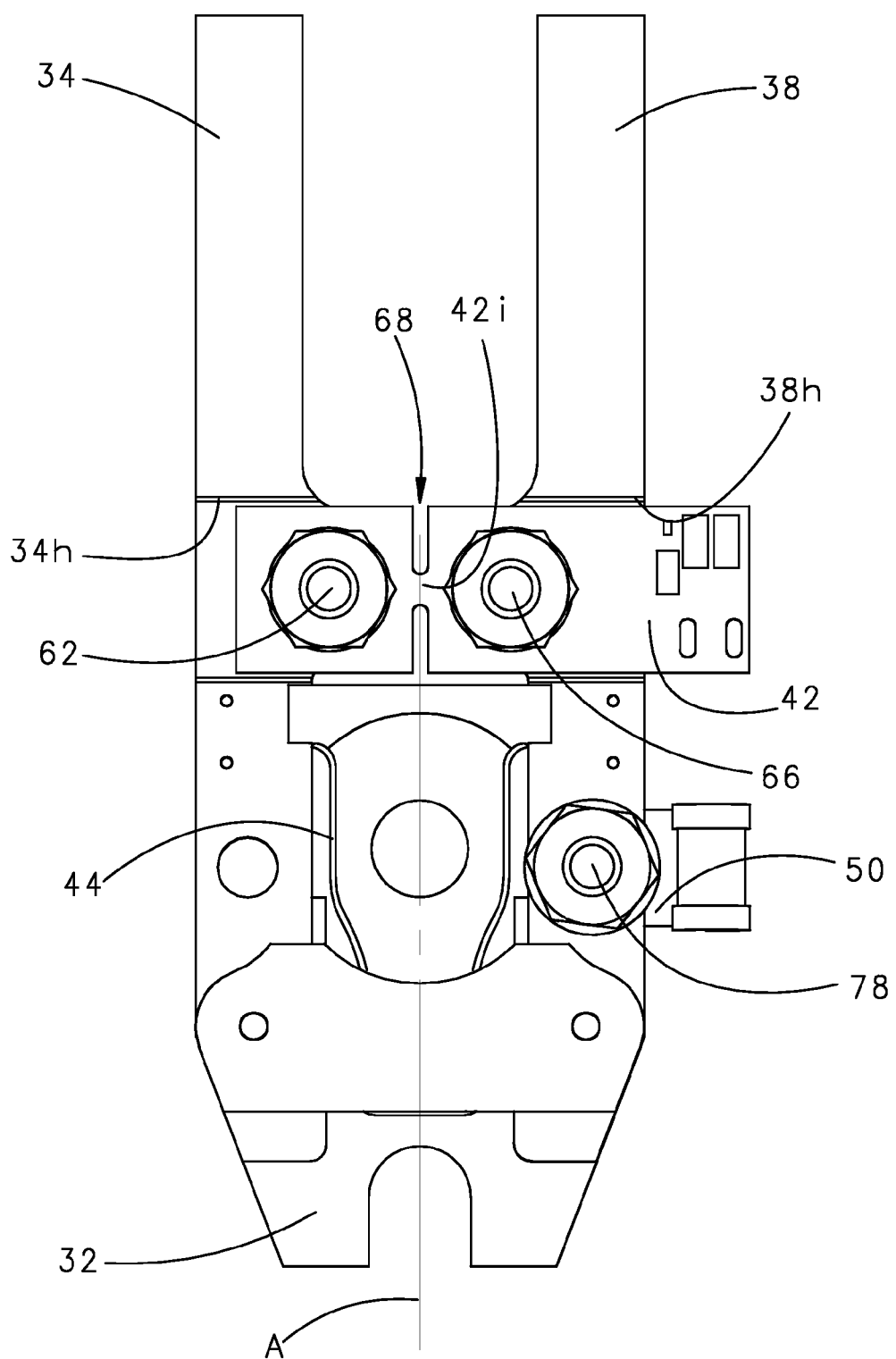
FIG. 8A is a top view of the sensor in a closed circuit condition.
Figure 8B:
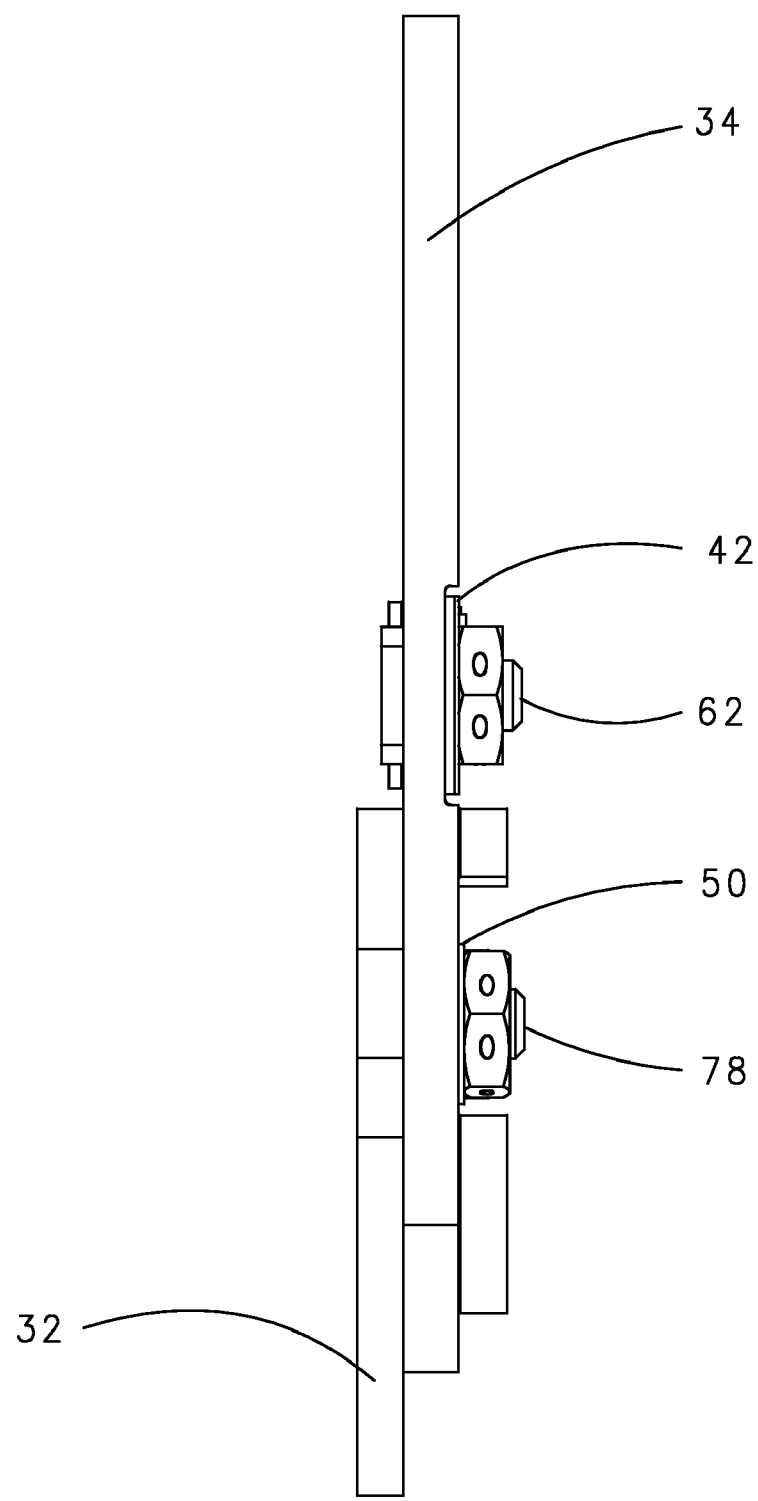
FIG. 8B is a side view of the sensor of FIG. 8A.
Figure 8C:
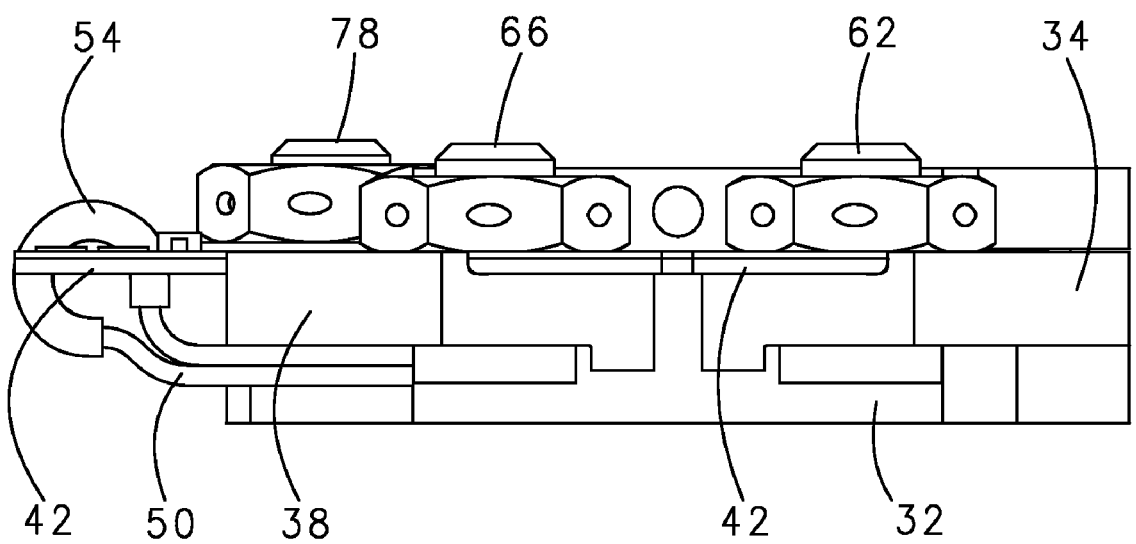
FIG. 8C is an end view of the sensor of FIG. 8A.
Figure 9:
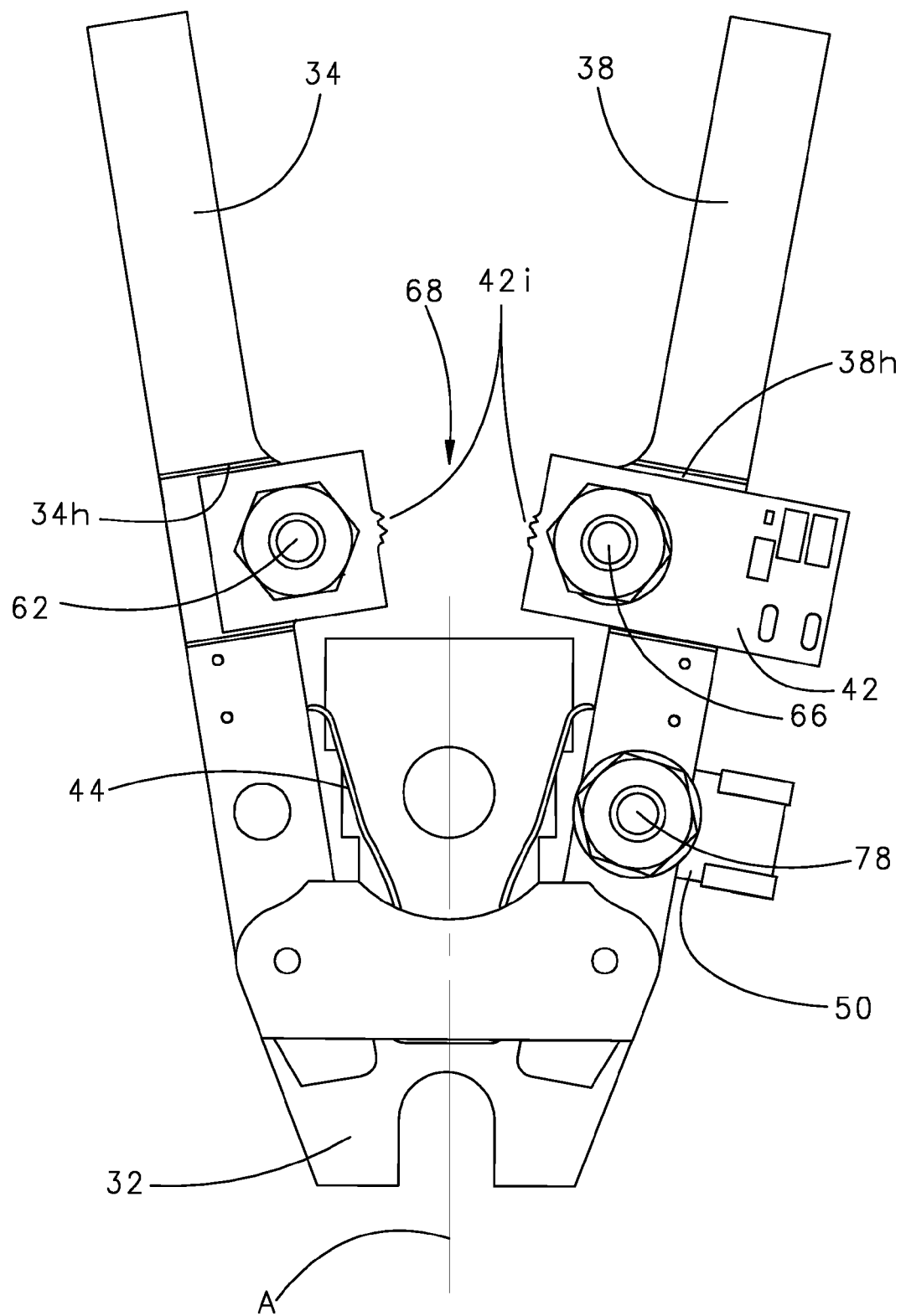
FIG. 9 is a view similar to FIG. 8A but showing an open circuit condition.

FIGS. 8A-8C illustrate an assembled condition of the sensor 30 in the first or closed position. FIG. 9 is a view like that of FIG. 8A but shows an open circuit condition. As shown in FIG. 8A, the circuit board 42 is received within the recessed areas 34h and 38h of the first 34 and second 38 arms. The removed section 68 is offset from a central axis A of the base 32 in a direction toward the second arm 38. As shown in FIGS. 8B and 8C, the fasteners 62, 66, and 78 extend entirely through a thickness of a respective one of the arms 34, 38.

When the striker pin 74 (FIG. 3) contacts one of the first 34 or second 38 arms and meets or exceeds a predetermined force level, the circuit board 42 breaks at or near the narrow neck portion 42i to provide the open circuit (FIG. 9). A warning can then be communicated to the cockpit 20.

The sensor 30 provides a more reliable, cost-effective, solution for sensing relative movement between control surfaces. Further, the sensor 30 has fewer parts and is easier to assemble than prior designs, and has a lower profile. Also, another advantage with the present sensor is that it is not easily re-settable because the circuit board has to be replaced to re-set the sensor. This prevents resetting of the sensor without addressing the problem that caused the sensor to trigger. Further, the dormant failure mode of the circuit failing in the closed switch position is eliminated in the new design.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A sensor for detecting relative movement between two adjacent panels comprising:
   a base;
   a first arm pivotally attached to said base;
   a second arm pivotally attached to said base, said first and said second arms being held in a first position relative to each other to indicate a first condition, and said first and said second arms being movable relative to each other by a predetermined amount to indicate a second condition; and
   an electrical connecting element comprising a circuit board interconnecting said first and said arms, said electrical connecting element holding said first and said second arms in said first position and said electrical connecting element being breakable when said first and said second arms have moved relative to each other by at least said predetermined amount to indicate said second condition.

2. The sensor according to claim 1 wherein said circuit board includes an aluminum core.

3. The sensor according to claim 1 wherein said first condition comprises a closed circuit and said second condition comprises an open circuit.

4. The sensor according to claim 3 wherein said second condition indicates relative movement and load between adjacent panels that exceeds a predetermined limit.

5. The sensor according to claim 4 wherein said circuit board includes a connection interface to receive a direct current signal.

6. The sensor according to claim 5 wherein said direct current signal comprises an electrical signal.

7. The sensor according to claim 1 wherein said base is to be attached to a first panel with said first and said second arms to extend in an overlapping relationship to a second panel that is separate from the first panel and which includes a striker pin, and wherein said first and said second arms are moved relative to each other in response to contact of the striker pin against one of said first and said second arms.

8. The sensor according to claim 1 wherein said circuit board includes a first aperture that receives a first fastener to secure a first portion of said circuit board to said first arm, and includes a second aperture to receive a second fastener to secure a second portion of said circuit board to said second arm.

9. The sensor according to claim 8 wherein said circuit board includes a weakened section positioned between said first and said second portions with an electric circuit that passes across the weakened section.

10. The sensor according to claim 9 wherein said removed section comprises first and second slots extending inwardly from opposing edges of said circuit board, said first and said second slots being axially separated from each other by a narrow neck portion.

11. The sensor according to claim 10 wherein said circuit board breaks at said narrow neck portion to trigger indication of said second condition.

12. The sensor according to claim 1 wherein said electrical connecting element is non re-settable once said electrical connecting element is broken.

13. The sensor according to claim 1 wherein the electrical connecting element includes a weakened section, and wherein said electrical connecting element permanently breaks at said weakened section when said first and said second arms have moved relative to each other by at least said predetermined amount.

14. The sensor according to claim 1 wherein said circuit board comprises a generally flat body having a first end attached to said first arm and a second end attached to said second arm, and including at least one trace extending across said body.

15. A method of sensing relative movement between two adjacent panels comprising:
(a) providing a base that is attachable to a first panel;
(b) pivotally connecting first and second arms to the base such that the first and second arms overlap a second panel;
(c) attaching an electrical connecting element to the first and second arms to hold the first and second arms in a first position relative to each other, wherein the electrical connecting element comprises a circuit board and further including attaching a wire to the circuit board such that the circuit board can receive one of a direct and alternating current signal;
(d) breaking the electrical connecting element at a predetermined force when the first and second arms have moved to a second position to indicate that relative movement between the first and second panels has exceeded a predetermined limit.

16. The method according to claim 15 including having a closed circuit during step (c) and an open circuit during step (d).

17. The method according to claim 15 including replacing the electrical connecting element that was broken during step (d) with a new electrical connecting element to re-set sensing capability.

18. The method according to claim 15 including providing the electrical connecting element with a weakened section, and step (d) includes permanently breaking the electrical connecting element at the weakened section to trigger an indication that relative movement between the first and second panels has exceeded the predetermined limit.

19. A method of sensing relative movement between two adjacent panels comprising:
(a) providing a base that is attachable to a first panel;
(b) pivotally connecting first and second arms to the base such that the first and second arms overlap a second panel;
(c) attaching an electrical connecting element to the first and second arms to hold the first and second arms in a first position relative to each other, forming the electrical connecting element as a printed circuit board, attaching a first portion of the printed circuit board to the first arm with a first fastener, attaching a second portion of the printed circuit board to the second arm with a second fastener, and forming a narrow neck portion in the printed circuit board between the first and second portions; and
(d) breaking the electrical connecting element at a predetermined force when the first and second arms have moved to a second position to indicate that relative movement between the first and second panels has exceeded a predetermined limit and wherein the printed circuit board is broken at the narrow neck portion in response to contact of a striker pin mounted to the second panel against one of the first and second arms at the predetermined force.

* * * * *